United States Patent [19]

Conley

[11] 4,275,284

[45] Jun. 23, 1981

[54] GAS-SHIELDED ARC WELDING TORCH

[75] Inventor: James L. Conley, Kent, Wash.

[73] Assignee: Conley and Kleppen Enterprises, Inc., Auburn, Wash.

[21] Appl. No.: 61,002

[22] Filed: Jul. 26, 1979

[51] Int. Cl.³ .............................................. B23K 9/16
[52] U.S. Cl. ........................................ 219/74; 219/75
[58] Field of Search .................................. 219/74, 75

[56] References Cited

U.S. PATENT DOCUMENTS

| 2,468,808 | 5/1949 | Drake | 219/75 |
| 2,544,711 | 3/1951 | Mikhalapov | 219/74 |
| 2,685,631 | 8/1954 | Scheller | 219/75 |

Primary Examiner—E. A. Goldberg
Attorney, Agent, or Firm—Ford E. Smith; David L. Garrison

[57] ABSTRACT

An arc welding torch having electrode gripping means is located rearward in the torch head and remote from the welding operation which occurs in a carefully formed, unerratic, cooling atmosphere of shielding gas enveloping the electrode and flowing in collimated fashion.

5 Claims, 6 Drawing Figures

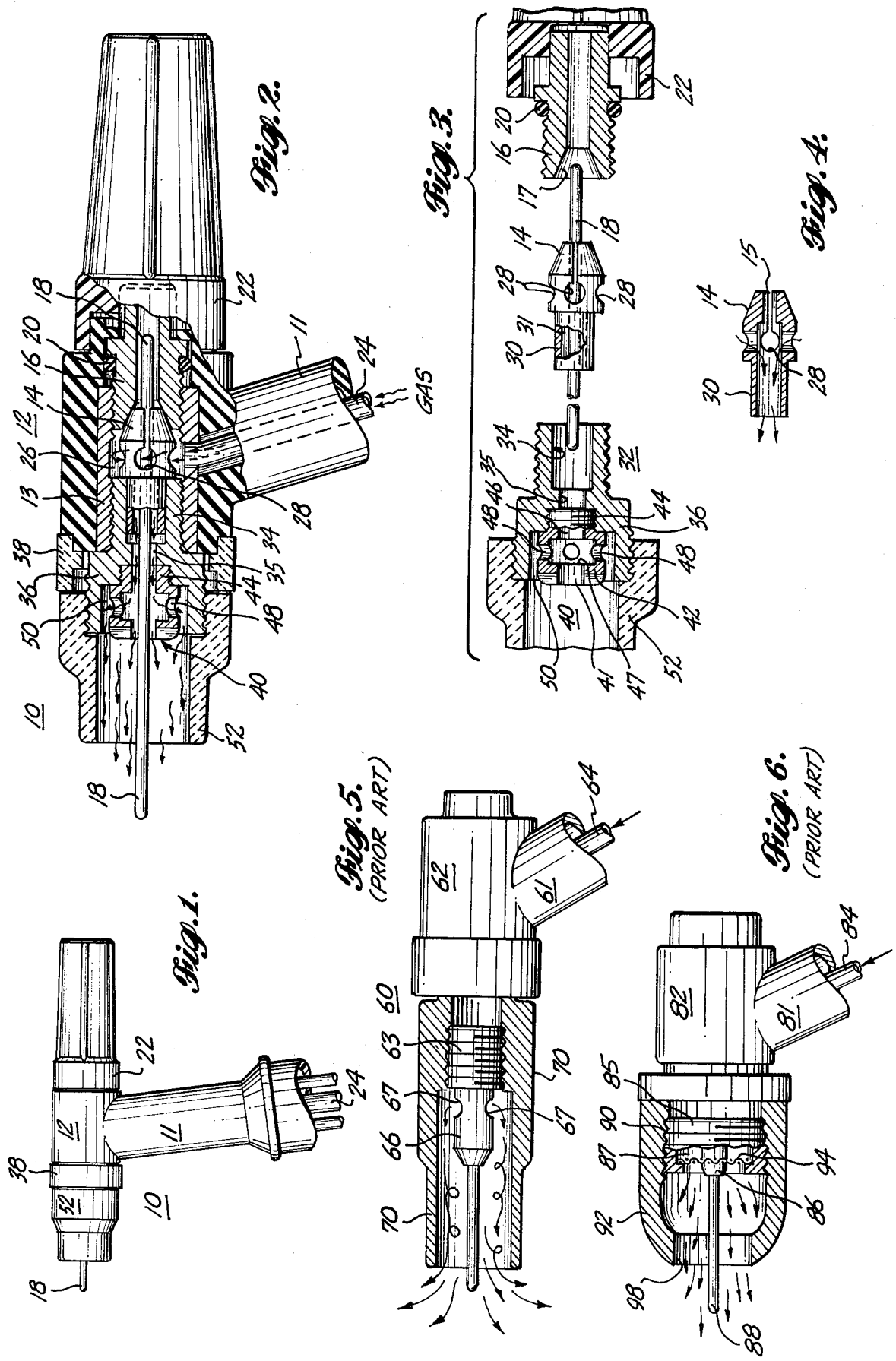

GAS-SHIELDED ARC WELDING TORCH

BACKGROUND OF THE INVENTION

According to prior practices gas-shielded arc welding torches have operated at too high temperatures to the detriment of the torch heads, the electrodes and the gas conducting and distributing means provided in the heads of prior torches.

The primary object of this invention has been to incorporate means for conducting and for distributing the inert shielding gas with marked cooling efficiency in spite of compactness in the torch design and the usual problems attendant upon employing high electrical currents.

SUMMARY OF THE INVENTION

An arc welding torch head supports an electrode axially within a gas-directing nozzle by collet means located rearwardly of the torch head and remote from the operating end of the electrode. Incoming gas flows into and through a hollow shank of the collet means to a gas distribution system which includes a perforated chamber surrounding the forwardly directed electrode and which in turn is surrounded in spaced relation by a cup member. The spacing of the cup vis a vis the means forming the perforated chamber constitutes a hollow cylindrical annular passageway through which the gas passes forward in a smooth collimated electrode-surrounding or enveloping stream substantially free of turbulence or erratic flaring.

DESCRIPTION OF THE DRAWINGS

FIG. 1 is a view of the head of a gas-shielded arc weldng torch;

FIG. 2 is an enlarged longitudinal sectional view of the torch head of FIG. 1;

FIG. 3 is an exploded sectional view of the gas distribution system of this invention;

FIG. 4 is a longitudinal sectional view of an electrode-gripping collet; and

FIGS. 5 and 6 are partial sectional views of the heads of prior art torches illustrating previous gas distribution systems.

PRIOR ART STATEMENT

The known pertinent or illustrative prior art, in addition to that depicted in the drawings, is as follows:

| PATENTS | | | |
| --- | --- | --- | --- |
| U.S. Pat. No. | Date | Patentee | Class |
| 2,468,806 | 5/1949 | Pilia | 219-15 |
| 2,820,075 | 1/1958 | Upton | 219-120XR |
| 2,863,984 | 12/1958 | Schaeffer et al | 219-75 |
| 2,943,183 | 6/1960 | Simms et al | 219-75XR |
| 3,056,018 | 9/1962 | Peterson | 219-75XR |

PUBLICATIONS

FALSTROM FLEX-I-TORCH Passaic, NJ 07055(Undated brochure received May 18, 1973)

Conley and Kleppen Enterprises, Inc. 8801 South 228th, Kent, WA 98031

Brochures CK 100V and CK 200 Series on T.I.G. TORCHES dated 2/70 and 2/71 respectively.

DESCRIPTION OF THE INVENTION

The invention is essentially shown in FIGS. 1, 2 and 3 wherein the gas-shielded arch torch body 10 is shown to comprise a shank 11 having head 12 on its distal end. At the rear of body 12 is cap 22 in opposition to a spacer sleeve 38 at the forward end. Ceramic nozzle 52 bears against spacer in the assembly. The electrode 18 extends from within head 12 and protrudes from the front end of the nozzle in the well known manner.

As best can be seen in FIG. 2 head 12 which is normally formed of molded rubber includes an internal sleeve 13 to which gas is conducted by the gas inlet conduit 24 entering through shank 11. Internal of sleeve 13 is collet 14 which has an internal electrode passage 15. As shown quite clearly in FIG. 4 the collet 14 has a conical surface on its rear end which is split to provide compressability of the collet in producing a gripping action about the electrode 18. Collet compressing sleeve 16 has an internal conical cup-like portion 17 to receive the tapered nose of the collet 14. When the two are pressed together the collet is compressed to produce the gripping action that has been described. Sleeve 16 is encircled by an O-ring 20 which seals the rear of head 12 in a gas-tight manner, preventing escape of the shielding gas. The cap 22 is associated with sleeve 16 in such a manner that manually an operator may screw the sleeve 16 into place in the torch head and to thus bring about secure gripping of the electrodes within the collet. The collet 14 has a forward extending sleeve 30 which is internally bored in a size to provide space 31 around the electrode 18. As shown in FIG. 2 gas flowing into the head through the passage 24 enters into the space 26 around the collet and passes to the interior of the collet through the holes 28. This entering gas then flows around the electrode as shown in FIG. 4 in a forward direction into the gas distributor system which in part comprises the gas distributor coupling 32, with its rear sleeve 34 and the forwardly open cup 36. The hollow shank 30 of the collet 14 telescopically extends into the rear sleeve 34 so that gas passing through sleeve 30 via chamber 31 is introduced into sleeve 34 and is delivered through passage 35 into cup member 36.

Spacer ring 38 on the forward end of head 20 surrounds the cup 36 and is held in place when the parts are assembled as when the surrounding nozzle 52 which is internally threaded is screwed on to the internally threaded cup 36.

The distributor member, designated as a whole by the numeral 40, comprises the head 42 and shank 44 that is screwed into the bottom of cup 36. Thus member 40 is in communication with passage 35 so that gas passing therethrough passes into passage 46 of shank 44 and chamber 47 in head 42 through which the electrode 18 normally extends. Chamber 47 is provided with a number of radially disposed gas outlet openings 48 through which the shielding gas flows into the annular passageway 50 surrounding head 42 as can be seen in FIGS. 2 and 3. The distributor head 42 and its internal chamber 47, together with the axial gas outlets 48 comprises a ported chamber in the cup member 36. The external annular surface of said chamber 50 is the inner surface of cup 36. This annular gas passageway 50 is of carefully selected predetermined radial and longitudinal dimensions that are related to the pressure of the incoming gas. The internal surface is carefully machined and is extremely smooth so that there is no frictional effect upon the gas flowing through the chamber or passageway 50. The openings 48 from the internal chamber of distributor member 40 are normal or perpendicular to the axis of the distributor heads 40, 42. It will be noted that there is an opening 41 at the forward end of head 42 through which the electrode passes. Some flow of the gas occurs through opening 41 around the electrode during operation.

As a result of this construction the inflowing gas surrounding the electrode is collimated so that it flows as a substantially straight stream parallel to the axis of the electrode and surrounding the electrode. This flow of gas is particularly devoid of either turbulance or erratic flow as well as being devoid of any tendency to flare or escape away from the close proximity to the electrode as has been observed to be a common problem in the prior art.

In FIG. 5 there is illustrated somewhat schematically a known prior art torch 60 in which shank 61 supports the head 62. Inflowing gas is introduced via conduit 64. On the front end of head 62 is support means for the collar 66 that extends forward and supports the electrode 68. The usual nozzle 70 is mounted on the support member 63 and embraces and encloses the collar 66 and the electrode 68. Gas flows out of the collar through passages 67 and the electrode and tends to acquire as shown schematically a turbulent or rolling action which is quite undesirable in the operation of a gas shielded arc welding torch.

Turning now to FIG. 6 wherein is illustrated another known prior art torch the shank 81 supports torch head 82. Gas is introduced through the gas inlet conduit 84 and passes forwardly into a chamber 87 within the support member 85 to which by threads the nozzle 92 is attached. The collar 86 centrally located and extending forward of head 82 passes through a screen or lens 94 into the chamber 93 within the nozzle 92 to thence emit through the passage 98 at the front of nozzle 92 in surrounding fashion to electrode 88. The gas that escapes into the nozzle chamber 93 through the expensively produced lens 94 tends to collimate as in the newly designed collet, but due to the relatively lower cost of production the new design is more desirable.

It is believed that the rearward location of the collet 14 in the torch head 12 and the provision of a continuous through passage for the incoming gas through the apertures in the collet head and around the electrode and into the chamber 47 in the distributor head 42 vents into the annular space or annular passageway 50 not only is a novel construction but it has considerable utility. The collimating effect in the gas that flows from the torch head around the electrode during welding operations insures that the actual weld is being performed in an inert and oxygen free atmosphere.

In the foregoing description has been set forth a preferred embodiment of the invention contrasted against at least two prior art structures that believe to have difficulties that have been overcome by the torch of this invention. It will occur to those skilled in the art to make substitutions and alterations in structural arrangements all such as clearly fall within the scope and the spirit of the subjoining claims when the same are liberally and appropriately construed having in mind the rule of equivalents to be part of this invention.

I claim:

1. In a gas shielded arc weldng torch:
    a torch body having a head;
    rearward directed collet means rearwardly associated with said head holding an electrode projecting forwardly through said head, said collet means including a forward projecting perforated hollow shank internally larger than the electrode received therein;
    means for supplying gas to the interior of said shank;
    a gas distributor located at the front of said head;
    said gas distributor comprising:
        a cup member having a sleeve extending rearward within said head and receiving telescopically the forward projecting hollow shank of said collet means and the electrode therein, said sleeve being internally sized to receive and forwardly pass gas from said shank;
        said cup member, in a predetermined spaced apart relation, forming an annular passage surrounding a chambered cylindrical head forward of said shank, said head being adapted to permit the forward protrusion of an electrode passed through said collet means and said shank;
        said chambered head being radially ported to permit the lateral egress of gas from within said chambered head to the space therebetween and the interior of said cup member;
        internally cylindrical, nozzle means surrounding and extending forward of the lip of said cup member.

2. In a gas shielded arc welding torch wherein a torch body has a hollow head which rearwardly includes means for clamping an electrode extending forwardly of said head and said clamping means is adapted to receive and pass gas in a forward direction around the electrode, the improvement, consisting essentially of:
    a gas distributor located at the front of the hollow head and comprising:
        a cup member adapted to receive gas moving forwardly around an electrode;
        means forming a ported chamber in said cup member having an external cylindrical surface spaced from and concentric of said cup interior and forming therewith an annular gas passageway of predetermined dimension, said chamber being ported normal of the axis of said head to discharge gas into said annular passageway;
        said chamber having an electrode passage permitting the protrusion forwardly of an electrode passed through said chamber; and
        nozzle means surrounding and extending forward of the lip of said cup member.

3. A weldng torch according to claim 1 in which the nozzle has an internal passage larger in diameter than the external diameter of said annular gas passageway.

4. A welding torch according to claim 1 in which the cup member is externally threaded and the nozzle is screwed thereon.

5. A welding torch according to claim 3 in which the cup member is metallic and the nozzle is ceramic.